(12) United States Patent
Iizuka et al.

(10) Patent No.: US 8,965,813 B2
(45) Date of Patent: Feb. 24, 2015

(54) INFORMATION PROCESSING APPARATUS, CONTROL METHOD THEREFOR, AND COMPUTER-READABLE STORAGE MEDIUM FOR DISPLAYING INFERENCE RESULTS FOR PLURAL INFERENCE CONDITIONS

(75) Inventors: Yoshio Iizuka, Yokohama (JP); Ryo Ishikawa, Kawasaki (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 13/050,269

(22) Filed: Mar. 17, 2011

(65) Prior Publication Data

US 2011/0246410 A1  Oct. 6, 2011

(30) Foreign Application Priority Data

Mar. 31, 2010  (JP) ................ 2010-083404

(51) Int. Cl.
 *G06F 15/18* (2006.01)
 *G06F 3/0484* (2013.01)
 *G06N 99/00* (2010.01)
 *G06N 5/04* (2006.01)

(52) U.S. Cl.
 CPC .......... *G06N 99/005* (2013.01); *G06F 3/04847* (2013.01); *G06N 5/04* (2013.01)
 USPC ............................... 706/11; 706/59; 715/765

(58) Field of Classification Search
 None
 See application file for complete search history.

(56) References Cited

U.S. PATENT DOCUMENTS 8,355,997 B2 * 1/2013 Kirshenbaum et al. ......... 706/12
2006/0204121 A1 * 9/2006 Bryll ............................. 382/255
2010/0199181 A1 * 8/2010 Robertson et al. ............. 715/709

FOREIGN PATENT DOCUMENTS

JP  07-281898 A  10/1995

OTHER PUBLICATIONS

Sboner, Andrea et al.; "A multiple classifier system for early melanoma diagnosis"; 2003; Elsevier; Artificial Intelligence in Medicine 27 (2003) pp. 29-44.*
Madden, Michael G. et al.; "A Machine Learning Application for Classification of Chemical Spectra"; 2008; http://hdl.handle.net/10379/205; 14 pages.*

* cited by examiner

*Primary Examiner* — Stanley K Hill
(74) *Attorney, Agent, or Firm* — Fitzpatrick, Cella, Harper & Scinto

(57) ABSTRACT

An information processing apparatus includes a display control unit adapted to, with respect to each of a plurality of predetermined attributes, display on a display unit, for each of a plurality of inference conditions, inference results obtained by inferring a probability that input data belongs to the attribute under the inference condition; and a receiving unit adapted to receive selection of one of a plurality of parameters for specifying an inference condition from a user, wherein the display control unit highlights, with respect to each of the plurality of inference conditions, the inference results according to values of the selected parameter of the inference condition.

17 Claims, 8 Drawing Sheets

INFORMATION PROCESSING APPARATUS, CONTROL METHOD THEREFOR, AND COMPUTER-READABLE STORAGE MEDIUM FOR DISPLAYING INFERENCE RESULTS FOR PLURAL INFERENCE CONDITIONS

BACKGROUND OF THE INVENTION

1. Field of the Invention

The present invention relates to an information processing apparatus, a control method therefor, and a computer-readable storage medium, and in particular to an inference technique for learning data whose attribute is known and inferring data whose attribute is unknown.

2. Description of the Related Art

As one data processing technique using a computer, an inference technique is known in which an unknown event is inferred based on the knowledge extracted from known events. Many inference apparatuses for inferring unknown events acquire knowledge used for inferring through supervised learning. Supervised learning refers to a method of learning a correspondence relationship (knowledge) between an attribute and a characteristic value; the characteristic value representing the characteristics of a target data set, and data sets having the same attribute as that of the target data (that is, data whose attribute is known (known data)). Note that the characteristic value may be referred to as an "observation value", and the attribute of data may be referred to as a "class" or "label". An inference apparatus infers, with respect to data whose attribute is not known (unknown data), the attribute thereof based on a characteristic value of the unknown data with the use of knowledge acquired through supervised learning. Accordingly, the quality of knowledge acquired through supervised learning has a large influence on the inference accuracy of the inference apparatus using that knowledge.

With conventional inference apparatuses, supervised learning is performed on the assumption that known data and unknown data have the same distribution. Therefore, it has been considered that if the accurate distributions of known data are learned by using a sufficient number of known data sets, the attribute of unknown data can be inferred accurately.

Also, Japanese Patent Laid-Open No. 7-281898 discloses a technique in which by weighting and integrating inference results obtained by a plurality of inference apparatuses that employ mutually different inference methods, it is possible to obtain more accurate inference results than using a single inference apparatus.

Recently, there has been an attempt to perform diagnosis support using an inference apparatus in the medical field. For example, a technique is under examination in which by inputting a characteristic value of a lesion site, the attribute thereof (diagnosis, etc.) is inferred.

However, when causing the inference apparatus for inferring an attribute of a lesion site to perform learning, there are cases in which a sufficient number of known data sets cannot be obtained. Furthermore, a method for acquiring characteristic values of lesion sites may change due to improvement in medical equipment, or characteristics or occurrence probabilities of a lesion may change along with time or environmental changes. Because of such reasons, the results of learning of the inference apparatus are not always satisfactory, and also there is no guarantee that the initial inference accuracy is maintained at a certain level. Therefore, the user (doctor) does not know to what extent he/she can rely on the inference results by the inference apparatus, and there are even doctors who think that the inference results by the inference apparatus are unreliable. Therefore, inference apparatuses have not been effectively used.

The above-described issues cannot be solved simply by improving the inference accuracy by increasing the number of learning data sets or using a plurality of inference apparatuses. In order to solve the above issues, it is necessary for an inference apparatus to present to users information for determining the reliability of the inference result.

SUMMARY OF THE INVENTION

The present invention is realized in view of the above-mentioned issues, and aims to provide a technique for enabling effective use of inference apparatuses.

According to one aspect of the present invention, an information processing apparatus includes: a display control unit adapted to, with respect to each of a plurality of predetermined attributes, display on a display unit, for each of a plurality of inference conditions, inference results obtained by inferring a probability that input data belongs to the attribute under the inference condition; and a receiving unit adapted to receive selection of one of a plurality of parameters for specifying an inference condition from a user, wherein the display control unit highlights, with respect to each of the plurality of inference conditions, the inference results according to values of the selected parameter of the inference condition.

According to another aspect of the present invention, a method for controlling an information processing apparatus, includes the steps of: a receiving unit receiving selection of one of a plurality of parameters for specifying an inference condition from a user; and a display control unit displaying on a display unit, with respect to each of a plurality of predetermined attributes, for each of a plurality of inference conditions, inference results obtained by inferring a probability that input data belongs to the attribute under the inference condition, wherein in the step of displaying, the inference results are highlighted with respect to each of the plurality of inference conditions, according to values of the selected parameter of the inference condition.

Further features of the present invention will become apparent from the following description of exemplary embodiments (with reference to the attached drawings).

DESCRIPTION OF THE EMBODIMENTS

Embodiments of the present invention will now be described hereinafter in detail, with reference to the accompanying drawings.

Functional Configuration of Inference Apparatus

Figure 1:
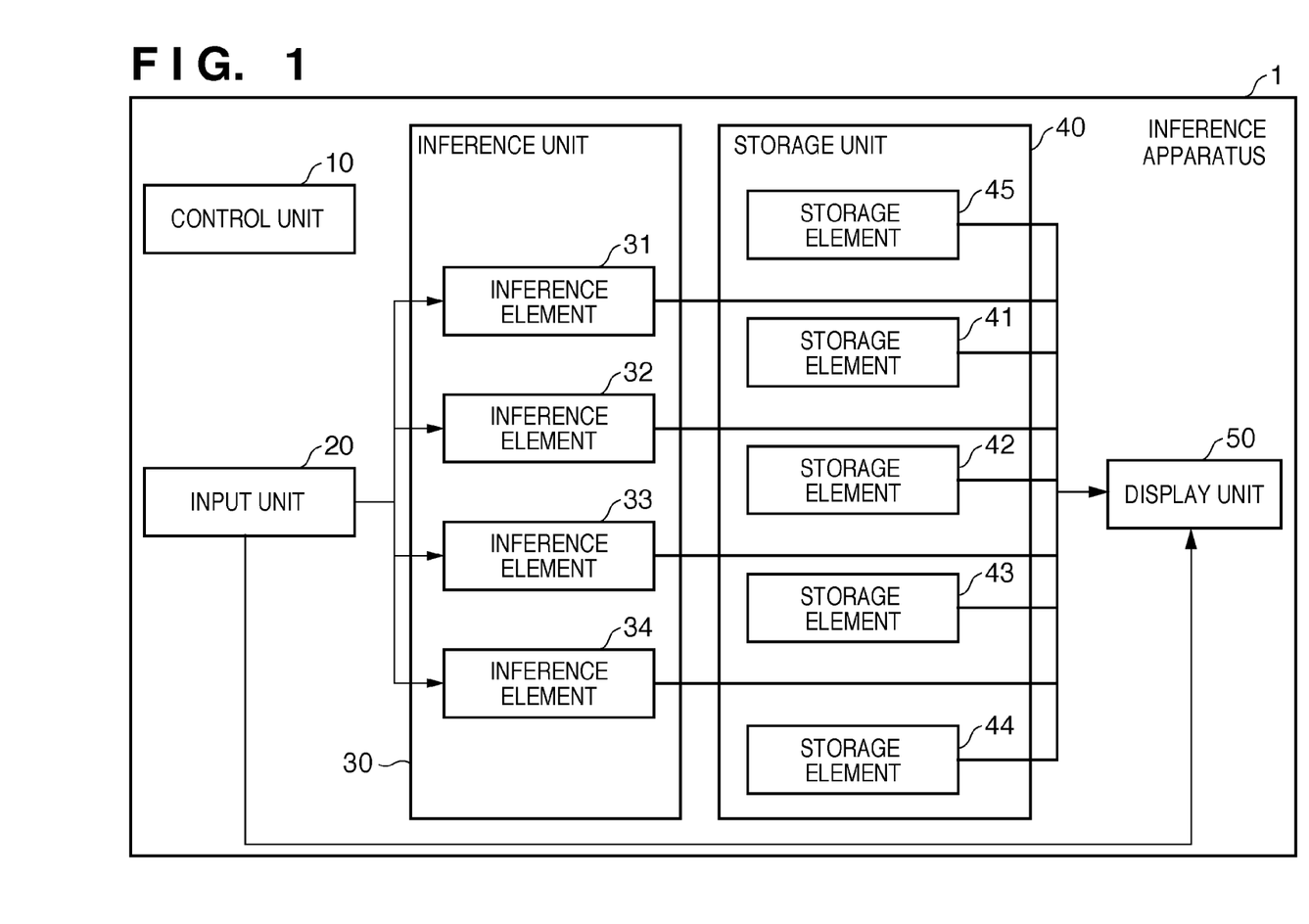
FIG. 1 is a block diagram illustrating a functional configuration of an inference apparatus.

FIG. 1 is a function block diagram illustrating a functional configuration of an inference apparatus according to an embodiment of the present invention.

An inference apparatus 1 is realized by executing a computer program for executing the control described below on a general computer (information processing apparatus). The inference apparatus 1 can be realized by implementing the below-described control with hardware. In addition, the inference apparatus 1 can also be realized by implementing part of the below-described control with hardware and implementing the other part of the control by a computer program, thereby constructing a hybrid system composed of hardware and a computer program.

The inference apparatus 1 includes a control unit 10, an input unit 20, an inference unit 30, a storage unit 40 and a display unit 50. The control unit 10 controls the entire inference apparatus 1 by the control procedure described below. Although not shown in the drawings, the control unit 10 is connected to all processing units and processing elements. The control unit 10 can be realized by, for example, a CPU 990 to be described later.

The input unit 20, according to the control by the control unit 10, inputs characteristic values of inference target data (unknown data), information (control parameters) such as display rules of inference results concerning control of the inference apparatus 1 from outside the inference apparatus 1.

The inference unit 30 includes a plurality of inference elements each of which has performed learning in advance using mutually different learning data sets or learning methods. In the example of FIG. 1, the inference unit 30 includes inference elements 31 to 34. The inference elements 31 to 34 each infer the attribute of inference target data based on the characteristic values of the inference target data (and the control parameters of the inference apparatus 1) that has been input through the input unit 20, according to the control by the control unit 10, and output the inference results to the display unit 50. At this time, since the inference elements 31 to 34 each have performed mutually different types of learning, even if the same characteristic value is input thereto, they may output mutually different attributes (inference results). Specifically, the inference elements 31 to 34 have mutually different inference conditions, and thus have mutually different inference accuracies. Note that the inference elements 31 to 34 need not be physically different from each other, and may be realized by using a single computer or hardware by time-sharing, for example, thereby performing control for outputting different inference results.

The storage unit 40 includes a plurality of storage elements that respectively corresponds to the plurality of inference elements. In the example of FIG. 1, the storage unit 40 includes storage elements 41 to 44 that respectively correspond to the inference elements 31 to 34. The storage elements 41 to 44 each store learning data or information on the learning methods that are used when the corresponding inference elements 31 to 34 performed learning. Also, the storage unit 40 includes a storage element 45 that stores control parameters or the like for specifying inference conditions of the inference apparatus 1. The storage unit 40 can be realized by a data storage device such as an external storage device 995 or RAM 992 to be described below. Note that the storage elements 41 to 45 need not be physically different from each other, and may be different storage regions secured on a single memory.

The display unit 50, based on the control by the control unit 10, reads out information stored in each of the storage elements 41 to 44 based on rules for displaying the inference results, which are control parameters of the inference apparatus 1, and based on this information, determines the display method of the inference results respectively input by the inference elements 31 to 34. The display unit 50 performs display control for displaying these inference results in a display device based on the determined display method.

For example, it is assumed that the inference elements 31 to 34 each have performed learning with the use of the following learning data sets.

Inference element 31: learning data acquired from cases that have accumulated in Hospital A for the past two years.

Inference element 32: learning data acquired from cases that have accumulated in Hospital A for the past ten years.

Inference element 33: learning data acquired from cases that have accumulated in Hospital B for the past two years.

Inference element 34: learning data acquired from cases that have accumulated in Hospital B for the past ten years.

In this case, the storage elements 41 to 44 each store the following pieces of information, respectively, for example.

Storage element 41: the number $N_{31}$ of learning data sets acquired from cases that have accumulated in Hospital A for the past two years, and the inference accuracy $A_{31}$ of the inference element 31.

Storage element 42: the number $N_{32}$ of learning data sets acquired from cases that have accumulated in Hospital A for the past ten years, and the inference accuracy $A_{32}$ of the inference element 32.

Storage element 43: the number $N_{33}$ of learning data sets acquired from cases that have accumulated in Hospital B for the past two years, and the inference accuracy $A_{33}$ of the inference element 33.

Storage element 44: the number $N_{34}$ of learning data sets acquired from cases that have accumulated in Hospital B for the past ten years, and the inference accuracy $A_{34}$ of the inference element 34.

Here, the inference accuracies $A_{31}$ to $A_{34}$ are calculated in advance for each of the inference elements 31 to 34, by using known evaluation methods such as an interference test or data division method.

Hardware Configuration of Inference Apparatus

Figure 8:
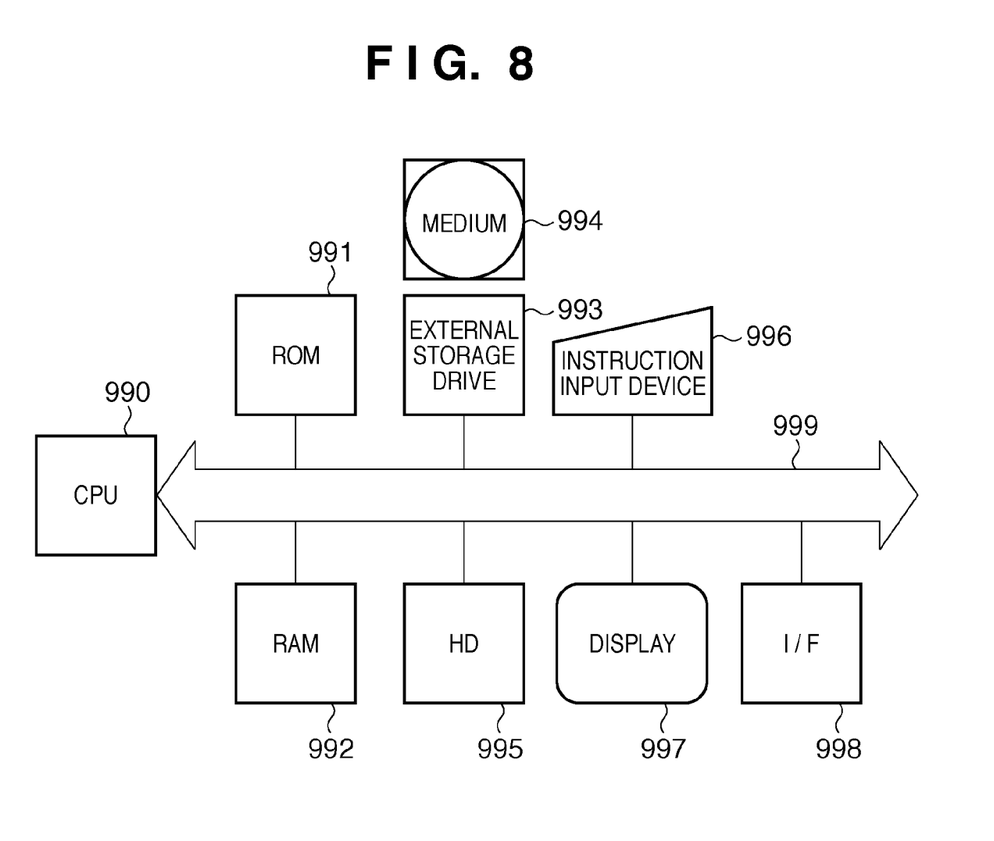
FIG. 8 is a block diagram illustrating a hardware configuration of the inference apparatus.

FIG. 8 is a block diagram schematically illustrating an example hardware configuration of the inference apparatus 1 according to the present embodiment. The inference apparatus 1 according to the present embodiment is realized by, for example, a personal computer (PC), work station (WS), mobile terminals, or smart phones.

In FIG. 8, a CPU 990 is a central processing unit, and cooperates with other constituent elements based on the operating system (OS), application programs or the like to control the entire operations of the inference apparatus 1. A ROM 991 is a read-only memory, and stores programs such as a basic I/O program, data used in basic processing or the like. A RAM 992 is a writable memory, and functions as a work area of the CPU 990, for example.

An external storage drive 993 realizes access to recording media, and is capable of loading programs stored in a medium (recording medium) 994 to the system. The medium 994 includes, for example, a flexible disc (FD), CD-ROM, DVD, USB memory and flash memory. An external storage device 995 is a device functioning as a large-capacity memory, and a hard disk device (hereinafter referred to as an "HD") is used in the present embodiment. The HD 995 stores the OS, application programs, and the like.

An instruction input device 996 is a device for receiving inputs of instructions, commands or the like from the user, and a keyboard, pointing device, touch panel or the like corresponds to this. A display 997 displays commands input by the instruction input device 996, output of responses thereto from the inference apparatus 1, or the like. An interface (I/F) 998 is a device for relaying data exchange with external devices. A system bus 999 is a data bus for controlling data flow within the inference apparatus 1.

Note that the inference apparatus can be constructed as software that realizes similar functions as those of the above-described devices, rather than as a hardware device.

Control of Inference Apparatus

Next, a control method of the inference apparatus 1 is described with reference to the flowchart in FIG. 2 and display examples of a GUI (graphical user interface) in FIGS. 3 and 4. For the convenience of description, FIGS. 3 and 4 are described first.

Figure 3:
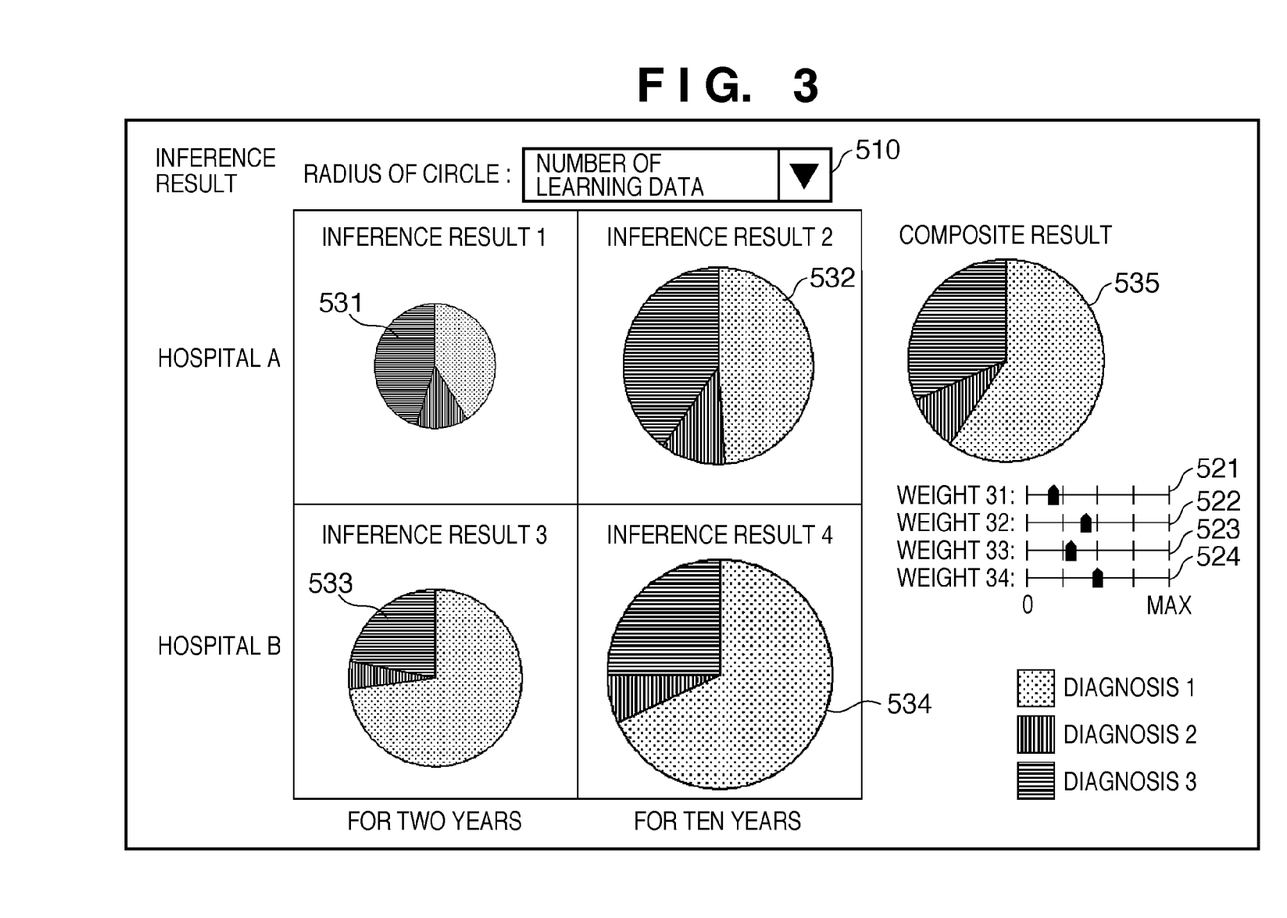
FIG. 3 shows an example of a first GUI display of the inference apparatus.
Figure 4:
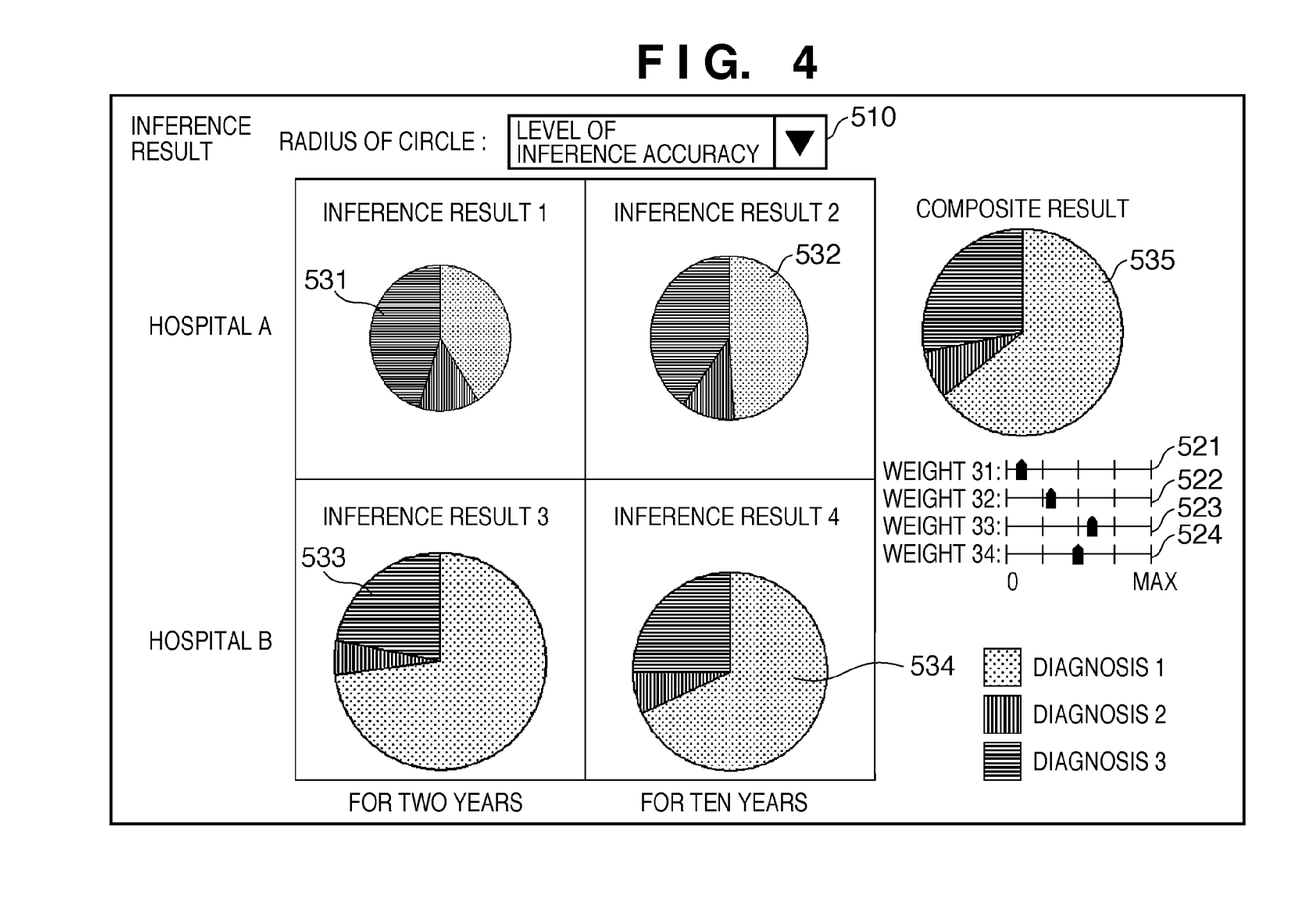
FIG. 4 shows an example of a second GUI display of the inference apparatus.

FIGS. 3 and 4 show first and second GUI display examples of the inference apparatus according to the present embodiment. The GUI is a user interface provided with the functions of both the input unit 20 and the display unit 50. In the following description of the components of the GUI, terms used in "Windows (registered trademark)", which is generally prevailing as an OS for the computers, are used.

The inference apparatus 1 performs reception processing of receiving selection of one of a plurality of parameters for specifying an inference condition from the user with the use of the GUI. Specifically, the user can input a display rule of the inference result, which is one of control parameters for specifying the inference condition of the inference apparatus 1, using a combo box 510. In the examples of FIGS. 3 and 4, the display rule is such that as a standard for determining the radii of the circles for displaying the inference results 531 to 534 provided respectively by the inference elements 31 to 34 as pie charts, either "by number of learning data sets" or "by level of inference accuracy" is used. Instead of the combo box, a list box, edit box or check box, or a button control such as a radio button may be used.

Also, the user can input weights for the inference results 531 to 534, weight being one of the control parameters of the inference apparatus 1, using sliders 521 to 524. Based on the weights input by the user, the display unit 50 displays a composite result 535 of the inference results. Instead of the slider, an edit box, a spin button or the like may be used for inputting the weights as numerical values.

FIGS. 3 and 4 show examples displaying the inference results of the attribute (diagnosis) of a lesion site in the image diagnosis support. The probabilities (degree of certainty of each diagnosis) of the diagnoses 1 to 3 are expressed by the central angle of each sector in the pie chart.

Control Procedure of Inference Apparatus

Figure 2:
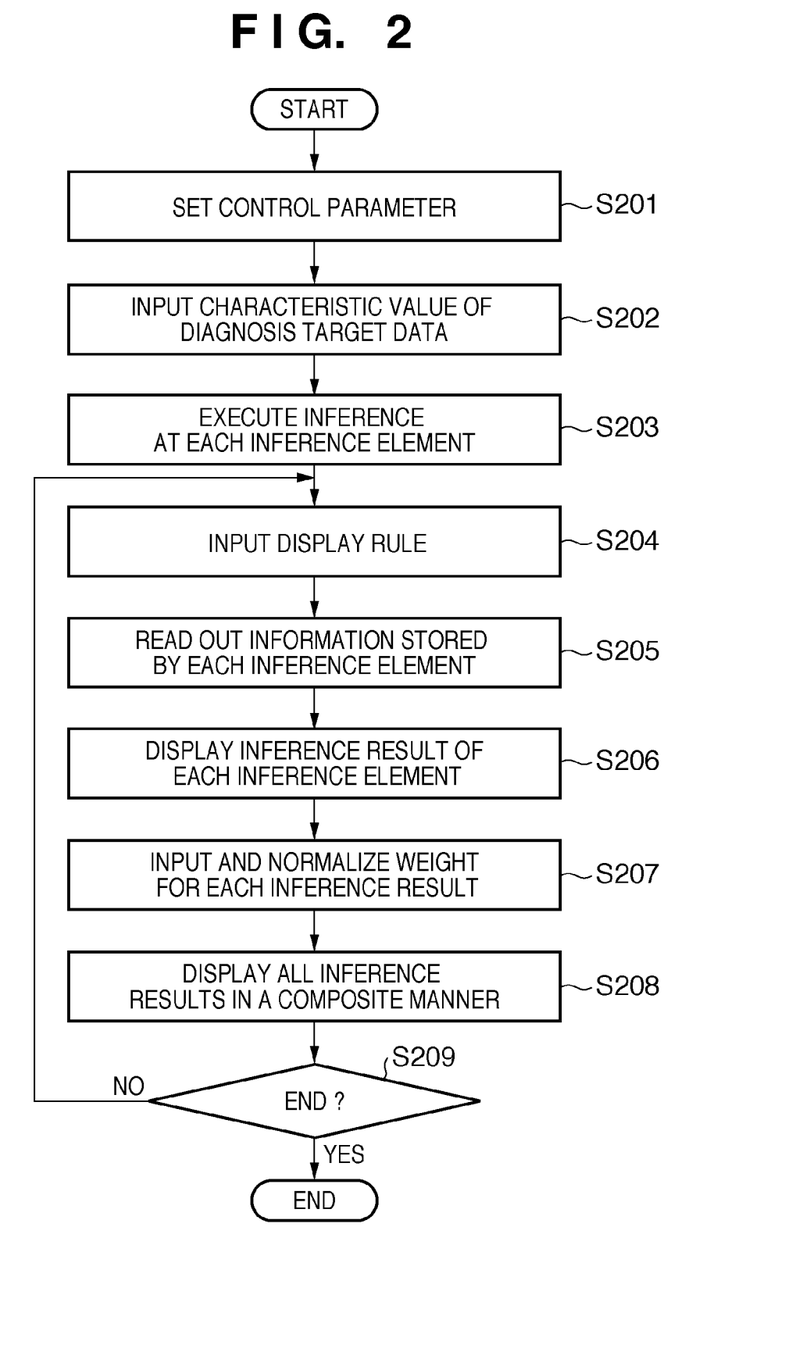
FIG. 2 is a flowchart illustrating a control procedure of the inference apparatus.

FIG. 2 is a flowchart illustrating the control procedure of the inference apparatus according to the present embodiment. The various types of processing shown in FIG. 2 are all controlled by the control unit 10.

In step S201, the control unit 10 sets initial values of the control parameters of the inference apparatus 1. The control parameters include the initial value of the display rule of the inference results and initial values of the weights for the inference results 531 to 534. Part of the set control parameters are displayed on the display unit 50. That is, the initial value of the display rule of the inference results is displayed in the combo box 510 described above. Also, the initial values of the weights for the inference results 531 to 534 are displayed in the sliders 521 to 524 described above.

In step S202, the input unit 20 acquires the characteristic values of inference target data, and supplies the characteristic values to each of the inference elements 31 to 34. In the case of inferring an attribute (diagnosis) of a lesion site by the image diagnosis support, the characteristic values correspond to an image feature amount, image finding or the like of a medical image serving as an inference target data. The image feature amount can be obtained by calculating a known geometric feature amount, a density feature amount or the like with respect to an abnormal area extracted by a known lesion area extraction method. The image finding refers to information that describes features of the image of an abnormal area found by the doctor during image interpretation using medical terms. The image finding is manually input by the doctor.

In step S203, the inference elements 31 to 34 each execute inference processing to obtain their respective inference results 531 to 534, and transmit the inference results 531 to 534 to the display unit 50. In the present embodiment, as an inference result $53n$ (n=1 to 4), a probability $P_{3nk}$ for a diagnosis k (k=1 to 3) is obtained. That is, $P_{3nk}$ represents a probability of the diagnosis being "k" inferred by an inference element $3n$, and $P_{3n1}+P_{3n2}+P_{3n3}=1$. As described above, the inference elements 31 to 34 have each performed learning using mutually different learning data sets or mutually different learning methods, and thus the inference results are different from each other.

In step S204, the input unit 20 acquires the display rule specified by the user using, for example, the combo box 510 described above. Note that processing in step S204 may be executed any time in response to an input from the user. After executing step S204 at arbitrary timing, the processing of step S205 onward is executed. Alternatively, if there is no input from the user, step S204 may be omitted.

In step S205, the display unit 50 reads out from the storage elements 41 to 44 information conforming to the display rule. In the examples of FIGS. 3 and 4, one of the number of learning data sets or the inference accuracy of the inference elements 31 to 34 is read out according to the designated display rule. Specifically, when "by number of learning data sets" is designated as the display rule as in FIG. 3, the numbers of learning data sets $N_{31}$ to $N_{34}$ are read out. Also, when "by level of inference accuracy" is designated as the display rule as in FIG. 4, the inference accuracies $A_{31}$ to $A_{34}$ are read out.

In step S206, the display unit 50 displays the inference results 531 to 534 of the inference elements 31 to 34 based on the information read out in step S205. As described above, the radii of the circles of the inference results 531 to 534 are determined based on the numbers of learning data sets $N_{31}$ to $N_{34}$ (FIG. 3) or the inference accuracies $A_{31}$ to $A_{34}$ (FIG. 4). For example, when "by level of inference accuracy" is designated as the display rule, a predetermined reference value of the radius (maximum value) $r_{max}$ is multiplied by each of the inference accuracies $A_{31}$ to $A_{34}$ (0 to 1), thereby determining the radius. Similarly, when "by number of learning data sets" is designated as the display rule, $r_{max}$ is multiplied by each of normalized numbers of the learning data sets, thereby determining the radius. Here, the value of the normalized number of learning data sets can be, for example, calculated by $N_{3n}/N_{max}$, using a maximum value among the values of $N_{3n}$, namely, $N_{max}$. In this manner, the display of the inference results 531 to 534 is changed in a regular manner based on the display rule.

In this manner, in the present embodiment, with respect to a plurality of inference conditions, the inference results are highlighted depending on the value of the control parameter (e.g., the number of learning data sets, or the inference accuracy) selected by the user. Therefore, the user can easily understand the relationship between the selected control parameters and the inference results. In addition, in the present embodiment, the inference results are displayed in graphs for each inference condition, and by setting the size of the entire graph corresponding to each inference condition depending on the values of the control parameters selected by the user, the inference results are highlighted. As a result, the user can readily understand the relationship between the selected control parameters and the inference results. In the present embodiment, for each inference condition, information indicating the corresponding inference condition (e.g., the name of the hospital, the period during which learning data was acquired) is displayed near the display of the corresponding inference result. Thus, the user can readily know the conditions under which the respective inference results were inferred.

In step S207, the input unit 20 uses the above-described sliders 521 to 524, for example, to acquire the weights (weights 31 to 34) for the inference results 531 to 534 that have been designated by the user. Then, the weights are normalized such that the total of the weights is 1. Note that in the following description, each normalized value of the weight $3n$ of the inference result $53n$ (n=1 to 4) obtained in step S207 is indicated as $W_{3n}$. Note that processing in step S207 may be executed any time in response to an input from the user. After executing step S207 at arbitrary timing, step S208 is executed. Alternatively, if there is no input from the user, input of weights in step S207 may be omitted.

In step S208, the display unit 50 composites the inference results 531 to 534 by the following calculation method, and displays the composite result 535. Initially, the display unit 50 calculates the probability $P_k$ of the composite result 535 with respect to the diagnosis k (k=1 to 3) using Equation 1.

$$P_k = W_{31} * P_{31k} + W_{32} * P_{32k} + W_{33} * P_{33k} + W_{34} * P_{34k}$$ (Equation 1)

With respect to the values $P_k$ obtained by this calculation, it is satisfied that $P_1+P_2+P_3=1$. Based on the values $P_k$ thus obtained, the display unit 50 determines the central angle of each sector in the pie chart of the composite result 535. Note that the radius of the pie chart of the composite result 535 may be a predetermined size (fixed value).

In this manner, in the present embodiment, the user is caused to select the weight assigned to each inference condition, the inference result under each inference condition is weighted with the selected weight, and thus the inference results under a plurality of inference conditions are displayed in a composite manner. Therefore, the user can appropriately select the weights of the inference results based on knowledge, experience, know-how or the like, thereby obtaining highly-accurate inference results.

In step S209, the control unit 10 determines whether or not to end processing of the inference apparatus 1, according to the instruction by the user received by the input unit 20. Then, if the control unit 10 determines not to end the processing, the processing of step S204 onward is executed again, and if the control unit 10 determines to end the processing, it ends processing of the inference apparatus 1.

In the procedure described above, processing of the inference apparatus 1 is executed.

As described above, the difference in the inference results acquired from a plurality of inference elements and the reason for such difference can be clearly displayed to the user, and thus the user can determine the reliability of the inference result of each inference element for him/herself. In addition, since the inference results acquired from a plurality of inference elements can be composited after the user has freely weighted the inference results, it is possible to acquire a composite result that is highly reliable for the user. Therefore, the user can effectively use the inference apparatus according to the present embodiment.

Furthermore, the reason for the difference in the inference results (difference in the learning data sets or learning methods) may be informed to the user in advance by an unshown screen display or the like. Alternatively, an arrangement may be made for enabling the user to confirm the reason why a plurality of inference results is mutually different at any time by an unshown screen display or the like. In this manner, the user can further examine the reason of the difference in the inference results, and therefore can determine the significance of the plurality of inference results more specifically. Taking the above-described example, for example, a certain user works in the hospital A, and weights case data of the hospital A more than that of the hospital B. In addition, since the hospital A replaced an image capture apparatus three years ago, the user considered that case data of the past two years is more reliable than that of the past ten years. In such a case, not only assigning a large weight to the inference result that conforms most to the condition selected by the display rule, but also assigning a comparatively large weight to the inference result learned from case data of the hospital A in the past two years become possible, which can assist deeper examination by the user.

In the foregoing embodiment, information relating to the reliability of each inference element (the radii of the pie charts in FIGS. 3 and 4) is displayed without being classified by the data attributes (diagnosis). An inference apparatus according to another embodiment displays information relating to the reliability of the inference elements according to the attribute of the learning data of the inference elements.

The configuration of an inference apparatus according to the present embodiment is the same as that of the foregoing embodiment. However, the contents of data held by the storage unit 40 and display processing by the display unit 50 differ from the foregoing embodiment. Only differences between the inference apparatus of the present embodiment and that of the foregoing embodiment will be described below.

Figure 5:
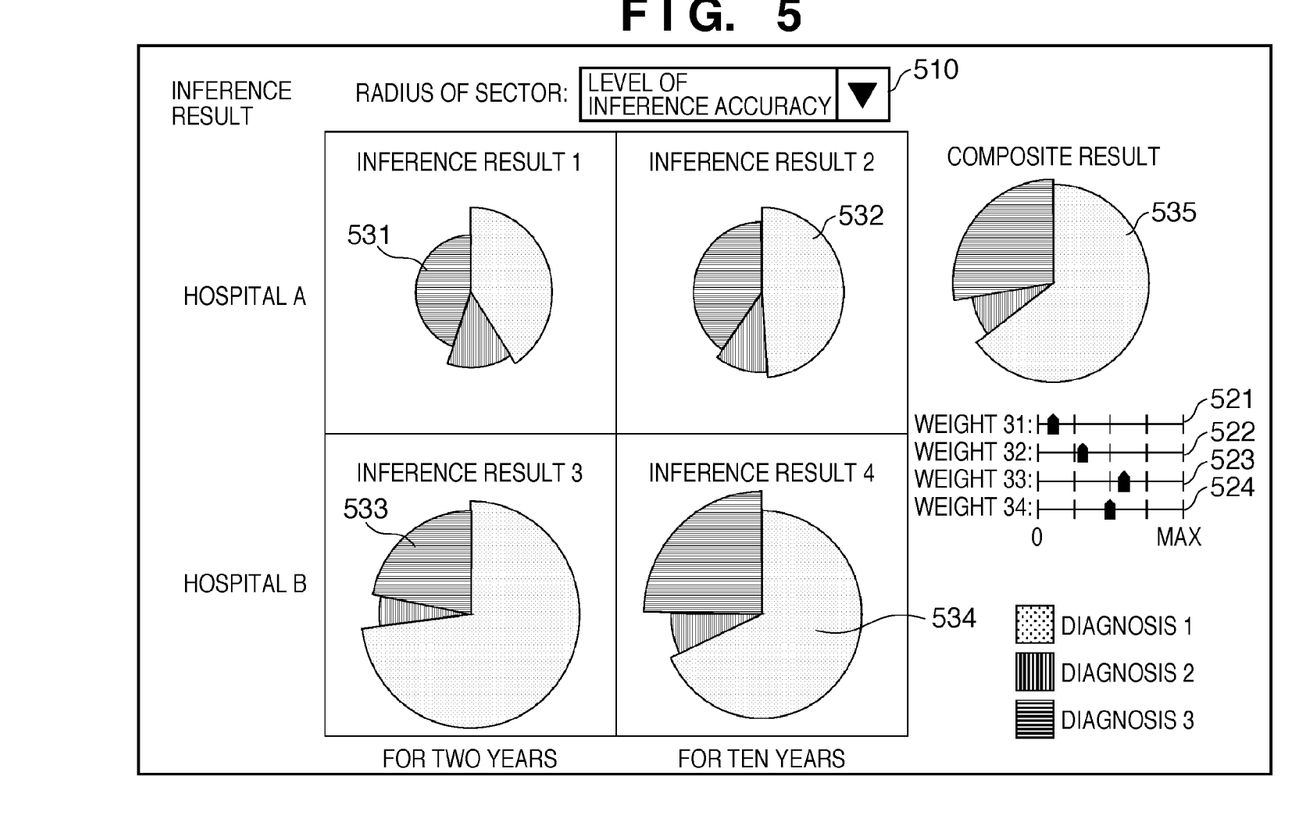
FIG. 5 shows an example of a GUI display of the inference apparatus.

FIG. 5 shows an example of a GUI display of the inference apparatus according to the present embodiment.

The screen configuration of GUI is similar to those in FIGS. 3 and 4. FIG. 5 differs from FIGS. 3 and 4 in terms of the display method of the graphs of the inference results 531 to 534 and the composite result 535.

In FIG. 5, the radii of the sectors are changed according to the diagnosis. In order to realize this display method, each of the storage elements 41 to 44 stores in advance information according to the diagnosis as described below, as information on the learning data or the learning methods that are used when causing the corresponding inference elements 31 to 34 to perform learning.

Storage element 41: As information acquired from the cases accumulated in the hospital A in the past two years,
  number of learning data sets $N_{311}$ having the attribute of diagnosis 1,
  number of learning data sets $N_{312}$ having the attribute of diagnosis 2,
  number of learning data sets $N_{313}$ having the attribute of diagnosis 3,
  inference accuracy $A_{311}$ of the inference element 31 for test data having the attribute of diagnosis 1,
  inference accuracy $A_{312}$ of the inference element 31 for test data having the attribute of diagnosis 2
  inference accuracy $A_{313}$ of the inference element 31 for test data having the attribute of diagnosis 3

Storage element 42: As information acquired from the cases accumulated in the hospital A in the past ten years, number of learning data sets $N_{321}$ having the attribute of diagnosis 1,
number of learning data sets $N_{322}$ having the attribute of diagnosis 2,
number of learning data sets $N_{323}$ having the attribute of diagnosis 3,
inference accuracy $A_{321}$ of the inference element 31 for test data having the attribute of diagnosis 1,
inference accuracy $A_{322}$ of the inference element 31 for test data having the attribute of diagnosis 2,
inference accuracy $A_{323}$ of the inference element 31 for test data having the attribute of diagnosis 3, Storage element 43: As information acquired from the cases accumulated in the hospital B in the past two years,
number of learning data sets $N_{331}$ having the attribute of diagnosis 1,
number of learning data sets $N_{332}$ having the attribute of diagnosis 2,
number of learning data sets $N_{333}$ having the attribute of diagnosis 3,
inference accuracy $A_{331}$ of the inference element 31 for test data having the attribute of diagnosis 1,
inference accuracy $A_{332}$ of the inference element 31 for test data having the attribute of diagnosis 2,
inference accuracy $A_{333}$ of the inference element 31 for test data having the attribute of diagnosis 3, Storage element 44: As information acquired from the cases accumulated in the hospital B in the past ten years,
number of learning data sets $N_{341}$ having the attribute of diagnosis 1,
number of learning data sets $N_{342}$ having the attribute of diagnosis 2,
number of learning data sets $N_{343}$ having the attribute of diagnosis 3,
inference accuracy $A_{341}$ of the inference element 31 for test data having the attribute of diagnosis 1,
inference accuracy $A_{342}$ of the inference element 31 for test data having the attribute of diagnosis 2,
inference accuracy $A_{343}$ of the inference element 31 for test data having the attribute of diagnosis 3.

The control procedure of the inference apparatus 1 according to the present embodiment is illustrated by the flowchart in FIG. 2, similarly to First Embodiment. However, steps S205, S206 and S208 are respectively modified as follows.

In step S205, the display unit 50 reads out information conforming to the display rule from the storage elements 41 to 44. In the example of FIG. 5, "by level of inference accuracy" is designated as the display rule, and thus the inference accuracies $A_{311}$ to $A_{313}$, $A_{321}$ to $A_{323}$, $A_{331}$ to $A_{333}$, $A_{341}$ to $A_{343}$ are read out. When "by number of learning data sets" is designated as the display rule, it is sufficient if the numbers of learning data sets $N_{311}$ to $N_{313}$, $N_{321}$ to $N_{323}$, $N_{331}$ to $N_{333}$, $N_{341}$ to $N_{343}$ are read out.

In step S206, the display unit 50 displays the respective inference results 531 to 534 of the inference elements 31 to 34 based on the information read out in step S205. The radius ($r_{3nk}$) of the sector having the diagnosis k (k=1 to 3) of the inference results 53n (n=1 to 4) is determined based on the inference accuracy $A_{3nk}$. Alternatively, the radius of the sector having the diagnosis k may be determined, depending on the display rule, based on the number of learning data sets $N_{3nk}$. The central angle of the sector having the diagnosis k of the inference result 53n is determined based on the probability $P_{3nk}$ of the diagnosis k of the inference result 53n. In this manner, the display of each of the inference results 531 to 534 is changed in a regular manner based on the display rule.

In step S208, the display unit 50 composites the inference results 531 to 534 by the following calculation method, thereby displaying the composite result 535.

The probability $P_k$ for the diagnosis k of the composite result 535 is calculated by using above Equation 1. The display unit 50, based on the value $P_k$ thus obtained, determines the central angle of each sector of the composite result 535. The radius ($r_k$) of the sector for the diagnosis k of the composite result 535 is calculated by using Equation 2.

$$r_k = W_{31}*r_{31k} + W_{32}*r_{32k} + W_{33}*r_{33k} + W_{34}*r_{34k} \quad \text{(Equation 2)}$$

In this manner, in the present embodiment, with respect to each inference condition, the inference results are highlighted for each attribute, according to the value of the predetermined control parameter that corresponds to the attribute. Therefore, the difference in the inference results acquired from a plurality of inference elements and the reason for such difference can be clearly displayed to the user according to the data attribute (diagnosis), and thus the user can determine the reliability of the inference result of each inference element for him/herself. In addition, since the inference results acquired from a plurality of inference elements can be composited after the user has freely weighted the inference results, it is possible to acquire a composite result that is highly reliable for the user. Therefore, the user can effectively use the inference apparatus according to the present embodiment.

In First Embodiment, information relating to the reliability of the inference elements (the radii of the pie charts in FIGS. 3 and 4 or the radii of the sectors in FIG. 5) is determined based on the display rule and information stored in the storage elements (the number of learning data sets or the inference accuracy). The information stored in the storage elements is information acquired when the inference apparatuses each have performed learning. Accordingly, if the display rule is not changed and the inference apparatuses do not perform learning at another time, regardless of the characteristic values of the inference target data, the information relating to the reliability of the inference elements remains unchanged. With the inference apparatus according to another embodiment, the information on the reliability is dynamically obtained for each inference element depending on the inference target data, and the obtained information is displayed. Specifically, out of learning data sets used for inferring the attribute to which input data belongs, learning data sets similar to the input data are distinguished. Then, the inference result is highlighted using, as the control parameter, the number of such similar learning data sets or the inference accuracy of the inference performed using such similar learning data sets.

Configuration of Inference Apparatus

Figure 6:
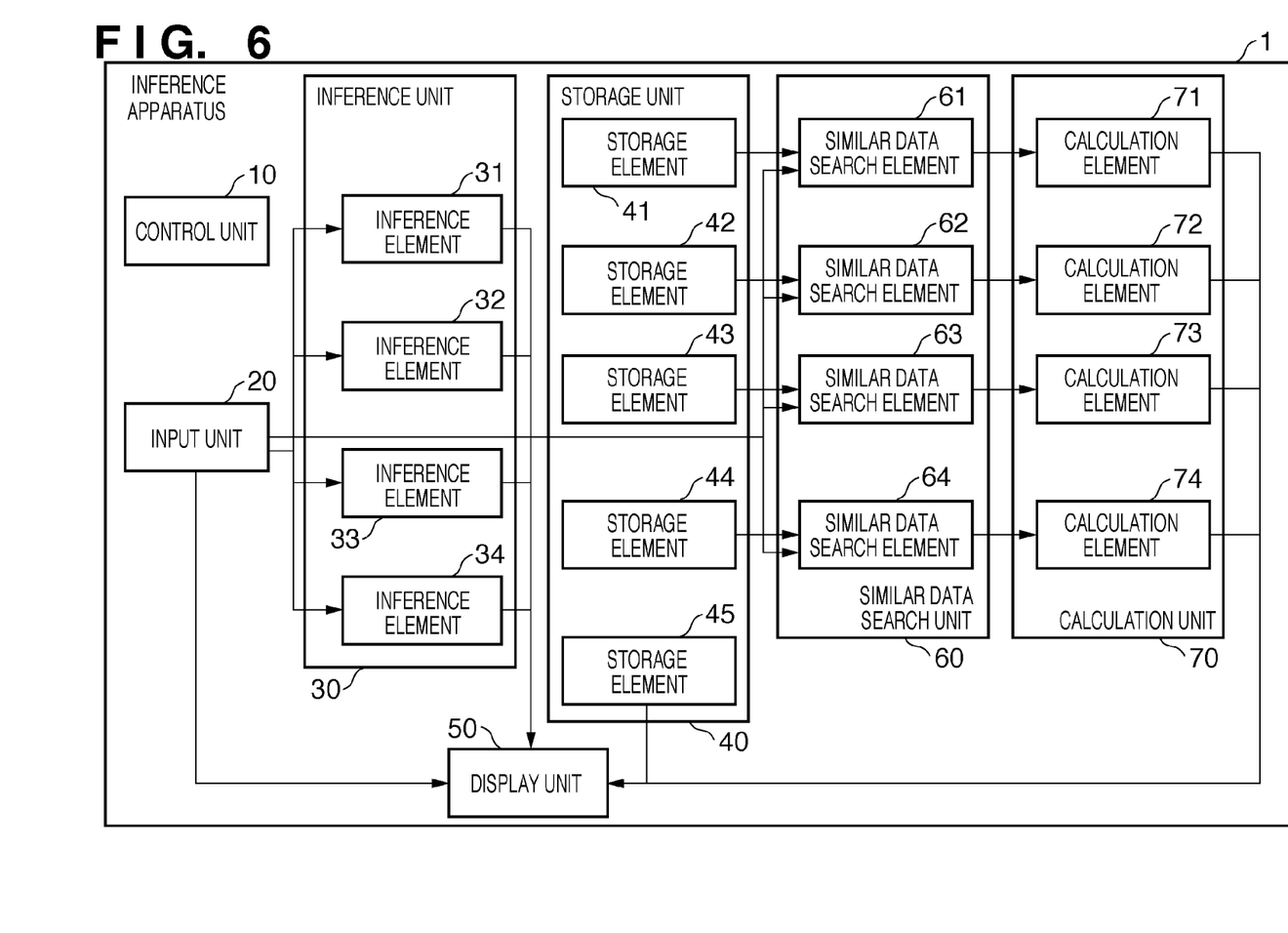
FIG. 6 is a function block diagram illustrating a configuration of the inference apparatus.

FIG. 6 is a functional block diagram illustrating a configuration of the inference apparatus according to the present embodiment.

The control unit 10, input unit 20, inference unit 30 and display unit 50 each have the same function as those described with reference to FIG. 1. A description of the inference apparatus according to the present embodiment is made below only for portions different from the foregoing embodiment.

The storage unit 40 includes the storage elements 41 to 44 that corresponds to the inference elements 31 to 34, respectively. The storage elements 41 to 44 each store information on known data sets used when causing their corresponding inference elements 31 to 34 to perform learning. The information on the known data sets contains the characteristic values and attributes of the known data sets, and inference results (information as to whether the attribute of the known data sets could be accurately inferred or not) of the known data sets by the corresponding inference elements. Also, the storage unit 40 includes the storage element 45 that stores control parameters or the like of the inference apparatus 1. Note that the storage elements 41 to 45 need not be physically different from each other, and may be different storage regions secured on a single memory. Alternatively, instead of the storage elements 41 to 45, an unshown database or external storage device connected to the inference apparatus 1 via an unshown communication line or network may be used.

A similar data search unit 60 includes similar data search elements 61 to 64 that respectively correspond to the inference elements 31 to 34 and the storage elements 41 to 44. The similar data search elements 61 to 64 each search for known data sets having characteristic values similar to those of the input inference target data.

A calculation unit 70 includes calculation elements 71 to 74 that respectively correspond to similar data search elements 61 to 64. The calculation unit 70 calculates information based on the display rule (control parameter) from retrieved known data sets.

Control Procedure of Inference Apparatus

Figure 7:
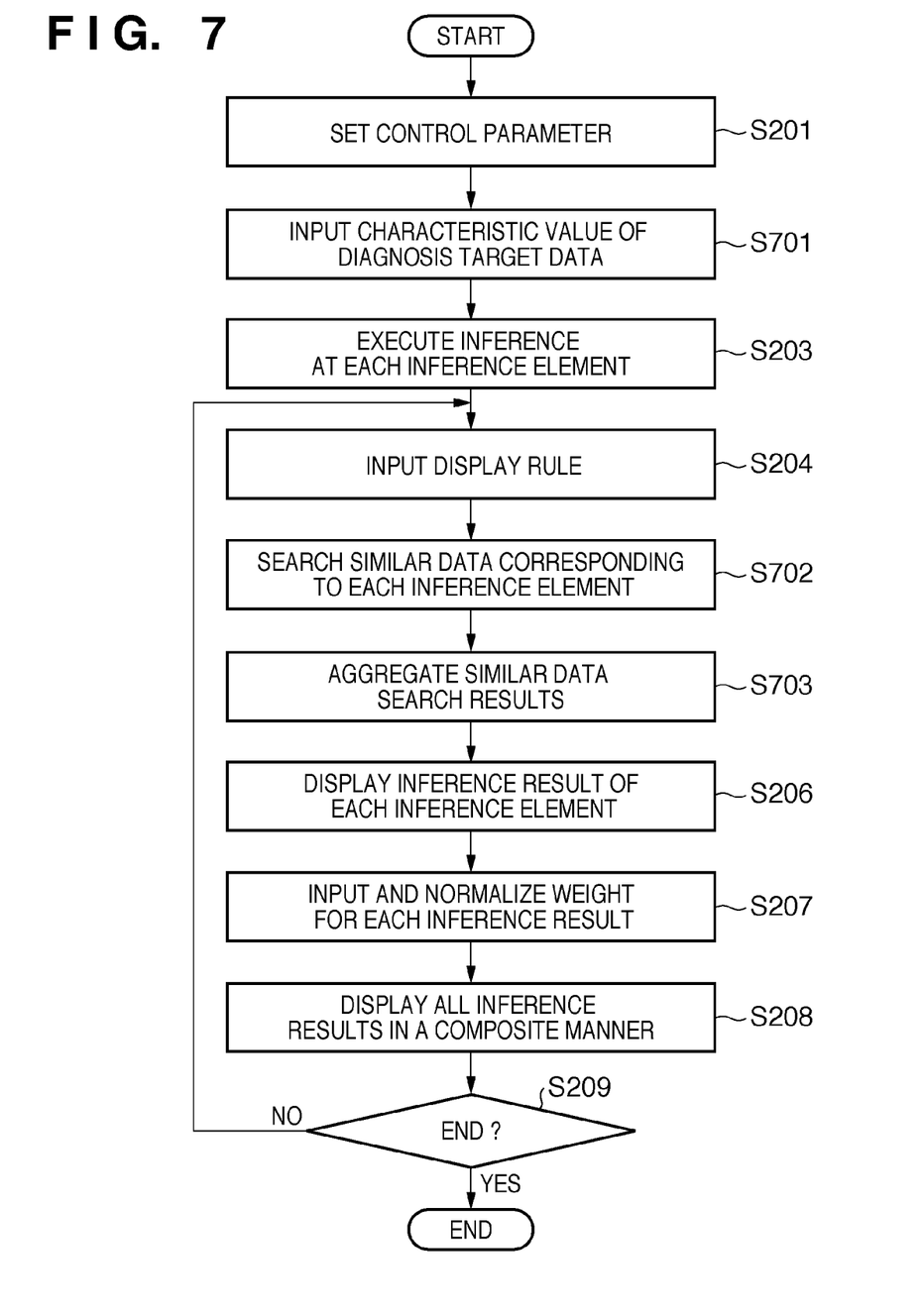
FIG. 7 is a flowchart illustrating a control procedure of the inference apparatus.

Next, the control procedure of the inference apparatus 1 according to the present embodiment is described with reference to the flowchart in FIG. 7. However, in processing steps to which the same step numbers as those in FIG. 2 are assigned (steps S201, S203, S204, S206 to S209), the same control as that described with reference to FIG. 2 is performed, and thus description thereof is omitted. Steps S701 to S703, which are different processing from steps in FIG. 2, are described below.

In step S701, the input unit 20 acquires the characteristic value of the inference target data, and supplies the characteristic value to each of the inference elements 31 to 34 and each of the similar data search elements 61 to 64 to be described later.

In step S702, the similar data search elements 61 to 64 each compare the characteristic value of the inference target data supplied by the input unit 20 with the characteristic values of all known data sets stored in the storage elements 41 to 44 respectively corresponding to the similar data search elements 61 to 64. Then, the similar data search elements 61 to 64 obtain a plurality of similar data sets by using a known similar data search technique. A known similar data search technique regards, as similar data, known data that serves as a comparison target whose characteristic value has a short distance (the distance between vectors, with each of the characteristic values being regarded as a multidimensional vector) to the characteristic value of the inference target data. Methods for selecting similar data sets include, for example, a method of selecting similar data sets in ascending order of distance (similarity) to the inference target data until the number of similar data sets reaches a predetermined number, and a method of selecting all the similar data sets whose distance (similarity) to the inference target data is equal to or lower than a predetermined threshold. In the following description, it is assumed that the similar data search elements 61 to 64 each use the latter method (the method of selecting all the similar data sets whose distance to the inference target data is equal to or lower than the threshold) to obtain a plurality of similar data sets.

In step S703, the calculation elements 71 to 74 each calculate information based on the display rule from a plurality of similar data sets obtained by the similar data search elements 61 to 64 respectively corresponding to the calculation elements 71 to 74. For example, the first display rule is set to the number of the similar data sets, and the second display rule is set to the level of the inference accuracy with respect to the similar data sets. When the first display rule is selected, the calculation elements 71 to 74 each calculate the numbers of a plurality of similar data sets obtained as the search results. Then, these values are normalized by using a predetermined value.

In contrast, when the second display rule is selected, each of the calculation elements 71 to 74 examines the inference result (information as to whether the attribute of known data sets could be accurately inferred or not) with respect to each of the plurality of similar data sets obtained as the search results. Here, the inference results of the similar data sets are read out from the storage elements 41 to 44 that respectively correspond to the calculation elements 71 to 74. Next, each of the calculation elements 71 to 74 calculates the ratio of the accurate inference results among the inference results of the plurality of similar data sets that have been read out, that is, the inference accuracy with respect to the similar data sets.

Thereafter, the processing of step S206 onward is executed, thereby performing display as illustrated in the GUI in FIGS. 3, 4 and 5. Note that the information relating to the reliability of the inference elements (the radii of the pie charts in FIGS. 3 and 4 or the radii of the sectors in FIG. 5) is displayed as information that varies depending on the display rule and information derived from the inference target data (and known data) (the number of similar data sets or the inference accuracy with respect to similar data sets).

As described above, the difference in the inference results obtained from a plurality of inference elements is clearly displayed to the user based on the number of similar data sets of the inference target data or the inference accuracy with respect to similar data sets, and thus the user can determine the reliability of the inference elements by him/herself. Furthermore, since the inference results obtained from a plurality of inference elements can be composited after the user has freely weighted the inference results, it is possible to acquire a composite result that is highly reliable for the user. Therefore, the user can effectively use the inference apparatus according to the present embodiment.

In FIGS. 3, 4 and 5, the difference in a plurality of the inference results and the reason therefor are clearly displayed to the user, by changing the radii of the pie charts or the radii of the sectors based on the display rule, however, there is no limitation to this. In other words, the display method based on the display rule can be changed also by using other graph displays or text displays. For example, in the case of using a bar chart, it is sufficient that the attributes (maximum values of the width or height, etc.) of the bars in a bar chart are changed in a regular manner based on the display rule. Also, in the case of using text display, for example, it is sufficient that the attributes of text (font size, text color, etc.) are changed in a regular manner based on the display rule. In addition, in an arbitrary chart or text display, the inference results may be arranged in descending order of conformity to the display rule.

As described above, according to the inference apparatus of the present invention, the difference in the inference results obtained from a plurality of inference elements and the reason therefor can be clearly displayed to the user, and thus an effect is achieved that the user can determine the reliability of the inference results by the inference elements by him/herself. As a result, there is an effect that the user can effectively use the inference apparatus.

The present invention can provide a technique that enables an effective use of an inference apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-083404, filed on Mar. 31, 2010, which is hereby incorporated by reference herein in its entirety.

What is claimed is:

1. An information processing apparatus comprising:
    a control unit configured to control a display unit to display, for each of a plurality of different inference conditions, respective inference results obtained by inferring an attribute to which input data belongs under the inference condition; and
    a receiving unit configured to receive selection of one of a plurality of parameters for specifying an inference condition,
    wherein the control unit is configured to control the display unit to display, differently according to values of the selected parameter of the inference conditions and concurrently, the respective inference results of the inference, for the input data, under the plurality of different inference conditions, and
    wherein a processor is included in the information processing apparatus.

2. The information processing apparatus according to claim 1,
    wherein the control unit is configured to control the display unit to:
    display the inference results for each of the plurality of different inference conditions by a graph, and
    highlight, with respect to each of the plurality of inference conditions, the inference results by setting a total size of the graph corresponding to the inference condition according to the values of the selected parameter of the inference condition.

3. The information processing apparatus according to claim 1, further comprising:
    a selection unit configured to cause a user to select weights to be respectively assigned to the plurality of different inference conditions; and
    a composite unit configured to composite the inference results inferred under the plurality of inference conditions, after weighting the inference results with the respectively selected weights,
    wherein the control unit is further configured to control the display unit to display the composited inference results.

4. The information processing apparatus according to claim 1, wherein the control unit is configured to control the display unit to display, for each of the plurality of inference conditions, information for specifying the inference condition near the display of the inference result.

5. The information processing apparatus according to claim 1, wherein the control unit is configured to, with respect to each of the plurality of different inference conditions, control the display unit to highlight the inference results for each of the plurality of attributes, according to a value of a pre-assigned parameter corresponding to the attribute.

6. The information processing apparatus according to claim 1, wherein the plurality of parameters for specifying an inference condition contain the number of learning data sets used for inferring an attribute to which the input data belongs.

7. The information processing apparatus according to claim 1, wherein the plurality of parameters for specifying an inference condition contain an inference accuracy of inference under the inference condition.

8. The information processing apparatus according to claim 1, wherein the control unit is configured to control the display unit to highlight the inference results using as a parameter, in the inference condition, the number of learning data sets similar to the input data out of the learning data sets used for inferring an attribute to which the input data belongs, or an inference accuracy of the inference performed using the similar learning data sets.

9. The information processing apparatus according to claim 1, further comprising:
    a plurality of inference units each configured to infer an attribute to which the input data belongs under mutually different inference conditions, and
    wherein the control unit is configured to control the display unit to display on the display unit inference results obtained as a result of each of the plurality of inference units having performed inference.

10. A method for controlling an information processing apparatus, comprising the steps of:
    receiving selection of one of a plurality of parameters for specifying an inference condition; and
    controlling a display unit to display, differently according to values of the selected parameter of the inference conditions and concurrently, respective inference results of the inference, for input data, under a plurality of different inference conditions.

11. A non-transitory, computer-readable recording medium storing a computer program for causing a computer to function as each unit included in the information processing apparatus according to claim 1.

12. An information processing apparatus comprising:
    a control unit configured to control a display unit to display, for each of a plurality of different inference conditions, respective inference results obtained by inferring an attribute to which input data belongs under the inference condition; and
    a receiving unit configured to receive selection of one of a plurality of parameters for specifying an inference condition,
    wherein the control unit is configured to control the display unit to concurrently and differently display the respective inference results of the inferences, for the input data, under the plurality of different inference conditions so that display forms of the respective inference results are different, in accordance with values of the selected parameter of the inference conditions corresponding to the respective inference results, and
    wherein a processor is included in the information processing apparatus.

13. A method for controlling an information processing apparatus, comprising the steps of:
    controlling a display unit to display, for each of a plurality of different inference conditions, respective inference results obtained by inferring an attribute to which input data belongs under the inference condition; and receiving a selection of one of a plurality of parameters for specifying an inference condition, wherein in the step of controlling, the display unit is controlled to concurrently and differently display the respective inference results of the inferences, for the input data, under the plurality of different inference conditions so that display forms of the respective inference results are different, in accordance with values of the selected parameter of the inference conditions corresponding to the respective inference results.

14. A non-transitory, computer-readable medium storing a computer program including instructions to be executed by a computer to perform the method of claim 13.

15. An information processing system including apparatuses comprising:

a control unit configured to control a display unit to display, for each of a plurality of different inference conditions, respective inference results obtained by inferring an attribute to which input data belongs under the inference conditions; and a receiving unit configured to receive a selection of one of a plurality of parameters for specifying an inference condition, wherein the control unit is configured to control the display unit to display, differently according to values of the selected parameter of the inference conditions and concurrently, the respective inference results of the inference, for the input data, under the plurality of different inference conditions, and wherein at least one processor is included in the information processing system.

16. An information processing system including apparatuses comprising:

a control unit configured to control a display unit to display, for each of a plurality of different inference conditions, respective inference results obtained by inferring an attribute to which input data belongs under the inference conditions; and a composite unit configured to composite the inference results inferred under the plurality of different inference conditions, after weighting the inference results, wherein the control unit controls the display unit to display the inference results composited by the composite unit and the respective inference results of the inference concurrently, and wherein at least one processor is included in the information processing system.

17. An information processing system including apparatuses comprising:

a control unit configured to control a display unit to display, for each of a plurality of different inference conditions, respective inference results obtained by inferring an attribute to which input data belongs under the inference conditions; and a receiving unit configured to receive selection of one of a plurality of parameters for specifying an inference condition, wherein the control unit is configured to control the display unit to concurrently and differently display the respective inference results of the inferences, for the input data, under the plurality of different inference conditions so that display forms of the respective inference results are different, in accordance with values of the selected parameter of the inference conditions corresponding to the respective inference results, and wherein at least one processor is included in the information processing system.

* * * * *